United States Patent [19]

Becker et al.

[11] Patent Number: 4,770,056

[45] Date of Patent: Sep. 13, 1988

[54] WINDOW LIFTER-DRIVE UNIT, ESPECIALLY FOR A CABLE-WINDOW LIFTER

[75] Inventors: Herbert Becker; Gerhard Schelhorn; Lueben Petrov, all of Coburg, Fed. Rep. of Germany

[73] Assignee: Brose Fahrzeugteile GmbH & Co. KG, Fed. Rep. of Germany

[21] Appl. No.: 867,562

[22] Filed: May 28, 1986

[30] Foreign Application Priority Data

May 28, 1985 [DE] Fed. Rep. of Germany ....... 3519056

[51] Int. Cl.$^4$ .................. E05F 15/16; E05F 11/48
[52] U.S. Cl. .................. 74/505; 74/425; 74/89.2; 49/352
[58] Field of Search .......... 74/505, 425, 89.14, 74/506, 89.2, 89.21, 89.22, 411; 49/352

[56] References Cited

U.S. PATENT DOCUMENTS

| | | | |
|---|---|---|---|
| 1,903,056 | 3/1933 | Mattingly | 74/89.22 |
| 2,987,937 | 6/1961 | Sala | 74/89.22 X |
| 3,334,443 | 8/1967 | Eskra et al. | 74/89.2 |
| 4,314,692 | 2/1982 | Brauer et al. | 49/352 X |
| 4,367,660 | 1/1983 | Becker et al. | 74/425 |
| 4,428,250 | 1/1984 | Becker et al. | 49/352 X |
| 4,534,233 | 8/1985 | Hamaguchi | 74/89.2 |

FOREIGN PATENT DOCUMENTS

| | | | |
|---|---|---|---|
| 0139269 | 5/1985 | European Pat. Off. | 49/352 |
| 2952408 | 7/1981 | Fed. Rep. of Germany | 74/425 |
| 3148523 | 7/1983 | Fed. Rep. of Germany | . |
| 2029502 | 3/1980 | United Kingdom | 49/352 |

Primary Examiner—Leslie A. Braun
Assistant Examiner—Scott Anchell
Attorney, Agent, or Firm—Barnes & Thornburg

[57] ABSTRACT

A window-lifter drive unit for a cable-window lifter which includes a housing in which a worm gear as well as a cable drum taken along by the worm gear are provided between two mutually opposite wall parts. A bearing bolt 40 is supported with one end thereof in one of the two wall parts and at the other end thereof in the other wall part by way of a bearing bushing. The cable drum is retained at the outer circumference of the bearing bushing; a circumferential collar of the bearing bushing forms a securing member against pulling off the cable drum from the bearing bushing. Combined with a simple construction and low manufacturing costs, a partial unit including the worm gear as well as the bearing bolt can be separated without difficulty from a partial unit including the cable drum as well as the bearing bushing which facilitates assembly and repair work.

15 Claims, 1 Drawing Sheet

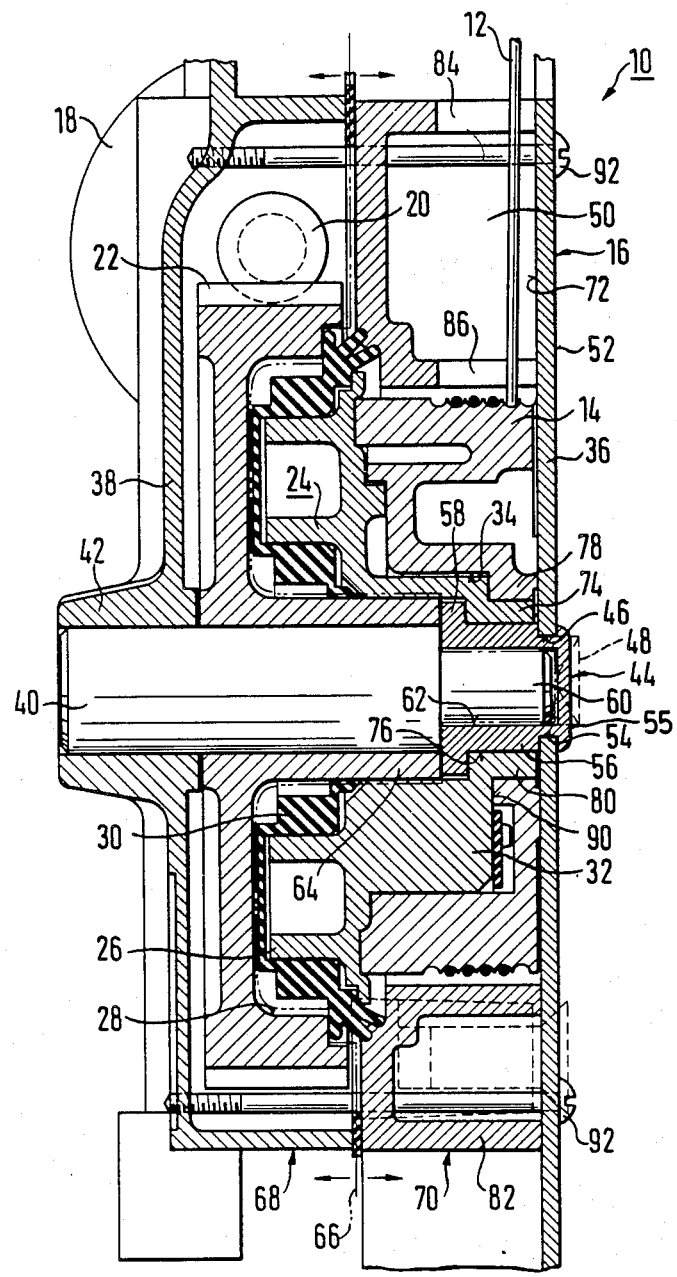

WINDOW LIFTER-DRIVE UNIT, ESPECIALLY FOR A CABLE-WINDOW LIFTER

The present invention relates to a window lifter-drive unit, especially for a cable window lifter with a housing in which a worm gear driven by a driving motor and a driven member taken along by the worm gear are provided between two mutually opposite wall parts.

A window lifter-drive unit of this type is disclosed in DE-OS No. 31 48 523 (FIG. 1). The drive unit is thereby disassemblable into two separate partial units, namely, a partial unit on the motor side (motor-side partial unit) which includes the worm gear together with a driving motor and a partial unit on the output side (output-side partial unit) which includes the output member (in this case a cable drum). The bearing bolt supported in one wall part retains the worm gear in this wall part whereby the bearing place is correspondingly mechanically sturdily dimensioned in order to assure in the assembled condition as the sole bearing place for the bearing bolt an operation devoid of any problems. In order that the cable drum of the separate output-side partial unit which may possibly be provided already with the cable, retains its predetermined position, the cable drum is fitted-in in the axial direction between the other wall part and a partition wall part and for purposes of fixing in the radial direction is mounted on a bearing projection which is of relatively complicated shape and starts from the other wall part. The mentioned motor-side partial unit as well as the output-side partial unit can be delivered as separate parts. A simplified final assembly is also realized because the partial units can be completely preassembled. Finally, for repair purposes, the motor-side partial unit or the output-side partial unit can be selectively exchanged. However, the relatively large material and manufacturing expenditures are disadvantageous with this prior art solution.

The principal object of the present invention, by contrast, resides in providing a window lifter-drive unit of the aforementioned type which has a simplified construction and entails reduced manufacturing costs.

The underlying problems are solved according to the present invention in that a bearing bushing is secured at the one wall part in which the bearing bolt is retained while the output member or the worm gear is mounted on the outer circumferential surface thereof, and in that the bearing bushing is provided with a securing means against withdrawal of the output member, respectively, worm gear from the bearing bushing. The partition wall member can be dispensed with because the securing arrangement at the bearing bushing prevents a withdrawal of the output member of worm gear from the bearing bushing. The bearing bushing can be manufactured in a particularly simple manner. By reason of the bearing support of the bearing bolt which now takes place at both ends, the bearing place thereof at the one wall part can be dimensioned more weakly without loss of strength and rigidity.

A particularly simple safety arrangement against pulling off of the output member or worm gear is obtained according to the present invention if the bearing bushing is provided with at least one radially outwardly protruding projection at its end opposite the one wall part.

According to another feature of the present invention, the bearing bushing can be riveted together with the one wall part by means of a rivet head extending through an opening of the wall part. A particularly simple and thereby mechanically stable fastening of the separate bearing bushing at the wall part can be achieved thereby. The wall part can then be constituted by a plate-shaped part that can be manufactured in a particularly cost-favorable manner.

In order to be able to absorb abutment impacts and in order to be able to dampen rapidly rotary vibrations, an intermediate part provided with dampening elements is frequently provided in the force-transmission path between the worm gear and the output member. In order to be able to integrate this partition member without difficulties into the output-side partial unit, the present invention proposes that the intermediate member be provided with a bearing shoulder or collar which surrounds the bearing bushing while the output member is supported along the outer circumference thereof.

A mechanically stable mounting with small axial length (relatively short bearing bushing), can be realized according to the present invention if the bearing shoulder or collar of the intermediate member is provided at its end facing the one wall part with an end section of reduced diameter which is surrounded by a bearing shoulder or collar of the output member.

According to a further feature of the present invention, the worm gear, respectively, the output member may abut end face at the bearing bushing. This arrangement precludes above all an axial play of the worm gear.

If the bearing bolt according to the present invention, which is provided with an end section of reduced diameter, is inserted into the bearing bushing by means of this end section, then the stepped configuration of the bearing bolt assures, on the one hand, a mechanically stable bearing support of the worm gear (relatively large bearing diameter) and, on the other, a compact construction of the bearing support for the intermediate member and the output member (relatively small bearing bushing diameter).

The present invention also relates to a method for manufacturing a window-lifter drive unit of the type of contruction described hereinabove. The output-side partial unit can be assembled rapidly and simply of the output member includes a cable drum. With the use of a further housing part surrounding the output member, it is possible according to the present invention to avoid during assembly a conflict of the cable already placed over the cable drum with this further housing member if the intermediate member is mounted over the bushing and subsequently the output member is mounted on the bearing shoulder or collar of the intermediate member and the bearing bushing is connected with the one wall part, preferably by riveting.

These and other objects, features and advantages of the present invention will become more apparent from the following description when taken in connection with the accompanying drawing which shows, for purposes of illustration only, one embodiment in accordance with the present invention, and wherein:

The single FIGURE is an axial cross-sectional view through one embodiment in accordance with the present invention.

Referring now to the single figure of the drawing, the window-lifter drive unit generally designated by reference numeral 10 which is illustrated in this FIGURE is part of a cable-window lifter (not shown) on the inside of a motor vehicle door. A cable 12 indicated in the figure which leads in a closed loop from the drive unit 10 to an entrainment member engaging at the window to be lifted and back to the driving unit, is placed with at least one winding on a cable drum 14 within a housing 16 of the drive unit 10. The cable drum 14 is driven by an electric motor 18. The electric motor 18 thereby drives a drive pinion 20, indicated in the drawing, which meshes with the external teeth of a worm gear 22. The worm gear 22, in turn, takes along an intermediate member 24, for which purpose the latter engages with axially projecting entrainment pins 26 in corresponding apertures 28 of the worm gear 22 under interposition of a damping rubber member 30. The intermediate member 24 is non-rotatably connected with the cable drum 14 to rotate in unison therewtih and more particularly by way of an eccentric projection 32 of the intermediate mebmer 23 which engages in a complementary central aperture 34 of cable drum 14.

The described components of cable drum 14, worm 20, worm gear 22, and intermediate member 24 are fitted-in between two lateral wall parts of the housing 16, namely a wall part 36 illustrated to the right in the figure and a wall part 38. The wall part 36 is formed by a flat plate; the wall part 38 consists of a shaped part, especially of a cast part. Its bearing bolt 40 which is supported at both ends in the two wall parts 36 and 38, serves as bearing place both for the worm gear 22 as also for the intermediate member 24 and the cable drum 14. The bearing place of the bearing bolt 40 in the left wall 38 in the drawing is formed by a bearing shoulder or collar 42 made in one piece with this wall. The other bearing place consists of an approximately hat-shaped bearing bushing 44 which is rigidly secured at the right wall part 36. For that purpose, the bearing bushing 44 is inserted within the area of the hat-bottom into a through-opening 46 of the wall part 36 and is riveted together thereat with this wall part with rivet head 55 being formed. As indicated schematically in the drawing, the bearing bushing 44 may be provided for that purpose prior to the riveting with a conically inwardly bevelled end-face circumferential groove 48 which, during the riveting, is deformed radially outwardly into abutment at the outside 52 of the wall part 36 opposite the housing interior 50. In order to fix the bearing bushing 44 in the axial direction after the riveting, a section 56 of increased diameter and forming the side wall of the hat-shape adjoins toward the left the end section 54 which is inserted into the through opening 46. A radially outwardly projecting circumferential collar 58 which forms the hat rim, is formed at the left sleeve end, as viewed in FIG. 1.

An end section 60 of reduced diameter of the bearing bolt 40 is fitted into the bearing bushing 44 so that the end section 60 abuts therefore with its outer circumference at the inner circumference 62 of the bearing bushing 44. In principle, it would also be possible that the bearing bushing 44 is rotatably supported inside of the wall part 36 so that the bushing can rotate together with the bearing bolt 40. However, in the illustrated embodiment, the bearing bushing 44 is rigidly connected with the wall part 36 which simplifies the manufacture. The bearing bolt 40 can rotate in unison with the worm gear 22 so that its bearing places in the wall parts 36 (by way of the bearing bushing 44) and 38 are correspondingly formed in each case by a rotary bearing. The bearing bolt 40, however, may also be non-rotatably supported so that in that case the worm gear 22 has to be rotatably supported on the bearing bolt 40. The worm gear 22 is provided with a bearing shoulder or collar 64 which surrounds the bearing bolt 40 and is fitted-in in the axial direction between the left wall part 38 and the circumferential collar 58 of the bearing bushing 44.

The parts in the drawing to the left of the dash and dotted line 66 form an independent motor-side partial unit 68. It can be seen from the drawing that the bearing bolt 40 which is retained with its left end in the wall part 38, retains the worm gear 22 in engagement with the worm 20 also when this partial unit 68 is disassembled from the other partial unit designated as output-side partial unit 70. The output-side partial unit 70 again forms also an independent component in which its parts, especially the cable drum 14, remain in place also without the bearing bolt 40. This is achieved in that both the intermediate member 24 as also the cable drum 14 are rotatably supported on the bearing bushing 44, and more particularly between the circumferential shoulder or collar 58 and the inside 72 of the right wall part 36. The intermediate member 24 is, for that purpose, provided at its right end as viewed in the drawing, with a bearing collar 74 which rests on the outer circumference 76 of the section 56 of the bearing bushing 44 and is fitted-in between the circumferential collar 58 and the wall part 36. The cable drum 14 is supported on the intermediate member 24. For that purpose, a bearing collar 78 of the cable drum 14 surrounds an end section 80 of reduced diameter of the bearing collar 74 of the intermediate member 24.

A further housing part 82 which surrounds the cable drum 14, is rigidly connected in any known manner (not shown) with the plate-shaped wall part 36. Two cable slots 84 and 86 which are open toward the right are indicated in the drawing on the inside of the housing part 82, through which extends a section of the cable 12 that winds off the cable drum 14.

One proceeds in the following manner with the preassembly of the output-side partial unit 70:

At first, the intermediate member 24 is mounted over the bearing bushing 44 fixed in any suitable manner, for example, placed over the bearing bolt 40 in the drawing from the right) up to abutment at the circumferential collar 58. The further housing part 82 is now brought into its predetermined position whereupon the cable drum 14 is mounted over the circumferential collar 74 of the intermediate member 24. This sequence assures that the cable 12 which preferably had already been placed beforehand over the cable drum 14, does not impair the attachment of the intermediate member. Thereafter, the wall part 36 is assembled whereby the end section 54 of reduced diameter (the right end section in the drawing) extends through the opening 46 of the wall part 36 and projects beyond the outside 52 of the wall part 36. The bearing bushing 44 can now be riveted together with the wall part 36 in the manner already described. One does not need to fear that the parts of the output-side partial unit 70 come apart because the intermediate member 24 is fitted-in with its bearing collar 74 between the circumferential collar 58 of the bearing bushing 44 and the wall part 36 and the cable drum 14 is fitted-in with its bearing collar 78 between the stepped surface 90 of the intermediate member 24 which adjoins the section 80 of reduced diameter of the bearing collar 74, and the wall part 36.

The two partial units 68 and 70 are assembled in a simple manner in that one slides the bearing bolt 40 with its end section 60 of reduced diameter into the bearing bushing 44 whereby at the same time with a corresponding mutual angular position, the entrainment cams 26 of the intermediate member 24 enter into the complementary apertures 28 of the worm gear 22. Both partial units 68 and 70 can be secured at one another in any known manner, especially can be screwed together, as indicated in the drawing by the head-screws 92. These head screws rigidly connect with each other, for example, the two walls parts 36 and 38.

The disassembly of the two partial units 68 and 70 proceeds accordingly in the reverse sequence.

While we have shown and described only one embodiment in accordance with the present invention, it is understood that the same is not limited thereto but it susceptible of numerous changes and modifcations as known to those skilled in the art, and we therefore do not wish to be limited to the details shown and described herein but intend to cover all such changes and modifications as are encompassed by the scope of the appended claims.

We claim:

1. A window lifter drive unit comprising:

a motor-side partial unit and an output-side partial unit, said motor-side partial unit comprising a first wall member and a worm gear driven by a driving motor and mounted for rotation at said first wall member, said output-side partial unit comprising a second wall member and an output means mounted for rotation at said second wall member, said output-sside partial unit being provided with axially elongated bearing bushing means directly secured to the second wall member of said output-side partial unit, said bearing bushing means having an outer circumference, on which said output means is retained, said output means being secured at said bearing bushing means against axial movement by means of radially projecting circumferential collar, which operates together with the second wall means to clamp the output-side partial unit together as a separate self-contained unit which is detachably connectible as a unit to the motor side partial unit, an intermediate member located between said worm gear and said output means whereby said worm gear drives said intermediate member which in turn drives said output means.

2. A drive unit according to claim 1, said intermediate member provided with damping means between the worm gear and the output means when the drive unit is assembled, said intermediate member being provided with a bearing collar which surrounds the bearing bushing means of said output-side partial unit and which is clamped between the circumferential collar and the second wall member to form part of said self-contained output-side partial unit.

3. A drive unit according to claim 2, wherein said motor-side partial unit is provided with bearing bolt means mounted on the first wall member and having an outer circumference on which the worm gear is retained, said bearing busing means being provided with an opening for support of said bearing bolt means.

4. A window lifter drive unit according to claim 3, wherein said worm gear abuts an end face of the bearing bushing means.

5. A window lifter drive unit according to claim 3, wherein the bearing bolt means is inserted with an end section of reduced diameter into the bearing bushing means.

6. A window lifter drive unit according to claim 2, the intermediate member being provided with a bearing collar which surrounds the bearing bushing means while the output means is supported on the outer surface of said bearing collar.

7. A window lifter drive unit according to claim 6, wherein the bearing collar of the intermediate member is provided with an end section of reduced diameter at its end facing said second wall member end section being surrounded by a bearing collar of the output means.

8. A window lifter drive unit according to claim 7, wherein the bearing bolt means is inserted with an end section of reduced diameter into the bearing bushing means.

9. A window lifter drive unit according to claim 2, wherein one of said gear abuts an end face of the bearing bushing means.

10. A window lifter drive unit according to claim 2, wherein the output means includes a cable drum.

11. A drive unit according to claim 1, wherein said motor-side partial unit is provided with bearing bolt means mounted on the first wall member and having an outer circumference on which the worm gear is retained, said bearing bushing means being provided wtih an opening for support of said bearing bolt means.

12. A window lifter drive unit according to claim 1, in which the window lifter is a cable window lifter.

13. A window lifter drive unit according to claim 1, wherein said bearing bushing means is riveted together with said second wall member by means of a rivet head extending through an opening provided in said second wall member.

14. A window lifter drive unit according to claim 1, wherein the output means includes a cable drum.

15. A window lifter drive unit according to claim 23, wherein said bearing bushing means is riveted together with said second wall member by means of a rivet head extending through an opening provided in said second wall member.

* * * * *